(12) United States Patent
Hildebrand et al.

(10) Patent No.: US 10,376,992 B2
(45) Date of Patent: Aug. 13, 2019

(54) METHOD FOR MACHINING A WORKPIECE BY A LASER BEAM, LASER TOOL, LASER MACHINE, MACHINE CONTROLLER

(71) Applicant: SAUER GMBH LASERTEC, Pfronten (DE)

(72) Inventors: Peter Hildebrand, Pfronten (DE); Gottfried Reinicke, Kempten (DE)

(73) Assignee: SAUER GMBH LASERTEC, Pfronten (DE)

( * ) Notice: Subject to any disclaimer, the term of this patent is extended or adjusted under 35 U.S.C. 154(b) by 791 days.

(21) Appl. No.: 14/916,733

(22) PCT Filed: Sep. 5, 2014

(86) PCT No.: PCT/EP2014/068999
§ 371 (c)(1),
(2) Date: Mar. 4, 2016

(87) PCT Pub. No.: WO2015/032926
PCT Pub. Date: Mar. 12, 2015

(65) Prior Publication Data
US 2016/0193698 A1  Jul. 7, 2016

(30) Foreign Application Priority Data
Sep. 5, 2013 (DE) .......................... 10 2013 217 783

(51) Int. Cl.
*B23K 26/356* (2014.01)
*B23K 26/02* (2014.01)
(Continued)

(52) U.S. Cl.
CPC ............ *B23K 26/356* (2015.10); *B23K 26/02* (2013.01); *B23K 26/0622* (2015.10);
(Continued)

(58) Field of Classification Search
CPC .... B23K 26/356; B23K 26/02; B23K 26/082; B23K 26/0622; B23K 26/0648;
(Continued)

(56) References Cited

U.S. PATENT DOCUMENTS 9,815,143 B2 * 11/2017 Fazeny ................. B26D 5/007
9,908,200 B2 *  3/2018 Adams ............... B23K 26/0613
(Continued)

FOREIGN PATENT DOCUMENTS

| CN | 103889640 A  | 6/2014 |
|---|---|---|
| DE | 101 23 864 A1 | 12/2002 |

(Continued)

OTHER PUBLICATIONS

Office Action dated Aug. 2, 2017, issued in counterpart Korean Application No. 10-2016-7006099, with English translation. (15 pages).

(Continued)

*Primary Examiner* — David J Walczak
(74) *Attorney, Agent, or Firm* — Westerman, Hattori, Daniels & Adrian, LLP

(57) ABSTRACT

In a method for machining a workpiece by a pulsed laser beam emanating from a tool head, the pulsed laser beam is guided across the workpiece surface in a constant relative position between workpiece and tool head, and the workpiece is machined consecutively in a first and another second relative position. The operating parameters in the second relative position are controlled such that one or more laser pulse hit locations generated in the second relative position have a defined position with reference to one or more laser pulse hit positions generated from the first relative position, particularly lie in a one- or two-dimensional grid defined by plural laser pulse hit positions on the workpiece surface made from the first relative position.

7 Claims, 6 Drawing Sheets

(51) Int. Cl.
*B23K 26/082* (2014.01)
*B23K 26/0622* (2014.01)
*B23K 26/06* (2014.01)
*B23K 26/361* (2014.01)
*B23K 26/354* (2014.01)

(52) U.S. Cl.
CPC ........ *B23K 26/0648* (2013.01); *B23K 26/082* (2015.10); *B23K 26/354* (2015.10); *B23K 26/361* (2015.10)

(58) Field of Classification Search
CPC .... B23K 26/361; B23K 26/354; B23K 26/34; B23K 26/03; B23K 26/08; B23K 26/0643
See application file for complete search history.

(56) References Cited

U.S. PATENT DOCUMENTS

| | | | |
|---|---|---|---|
| 10,081,075 B2 * | 9/2018 | Kondo | B23K 26/0643 |
| 2011/0220625 A1 | 9/2011 | Pluss | |
| 2014/0131922 A1 | 5/2014 | Hildebrand | |

FOREIGN PATENT DOCUMENTS

| | | |
|---|---|---|
| DE | 103 24 439 A1 | 12/2004 |
| DE | 103 45 080 A1 | 5/2005 |
| DE | 103 52 402 A1 | 6/2005 |
| DE | 10 2004 013 475 A1 | 10/2005 |
| DE | 10 2011 106 097 A1 | 12/2012 |
| DE | 10 2011 078 825 A1 | 1/2013 |
| EP | 1 174 208 A2 | 1/2002 |
| EP | 1 613 447 A2 | 1/2006 |
| JP | 2-168946 A | 6/1990 |
| JP | 2001-345536 A | 12/2001 |
| WO | 00/18535 A1 | 4/2000 |
| WO | 2013/004850 A1 | 1/2013 |

OTHER PUBLICATIONS

International Preliminary Report on Patentability (Form PCT/IB/373) issued in counterpart International Application No. PCT/EP2014/068999) dated Mar. 8, 2016, with PCT/ISA/237 and PCT/IB/338 (14 pages).

Office Action dated Dec. 11, 2017, issued in counterpart Korean Application No. 10-2016-7006099, with English machine translation. (8 pages).

International Search Report dated Feb. 11, 2015, issued in counterpart International Application No. PCT/EP2014/068999 (2 pages).

* cited by examiner

METHOD FOR MACHINING A WORKPIECE BY A LASER BEAM, LASER TOOL, LASER MACHINE, MACHINE CONTROLLER

The invention relates to a method for machining a workpiece by a laser beam and to a laser tool, a laser machine and a machine controller according to the preamble of the independent patent claims.

Prior art is, among others, DE 1017322A, WO2000/18535, DE 10324439A, DE10352402A, DE102004013475A, EP1613447A1, DE102007012816, DE102007012815A, DE102007016056A.

Figure 1:
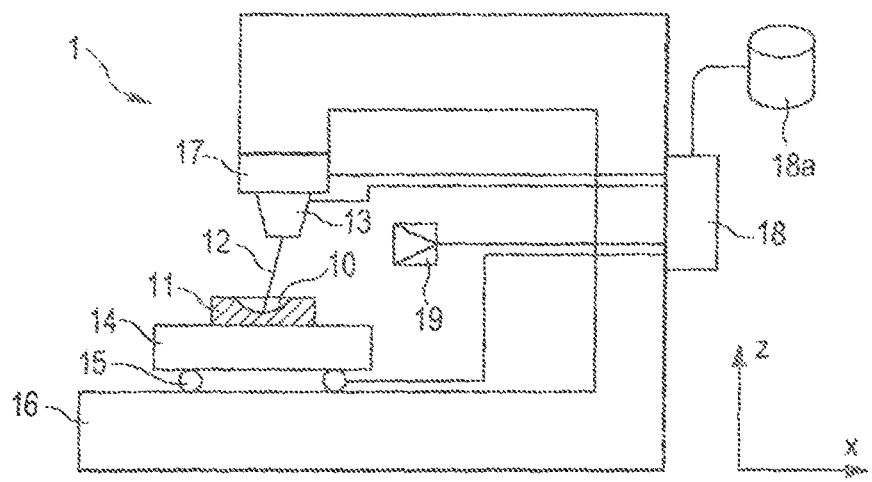

FIG. 1 schematically shows a known machine tool 1. The machine 1 comprises a machine frame 16. Adjustably mounted thereto is a workpiece table 14 which holds, in operation, a workpiece 11 firmly mounted thereto. Adjustability of the workpiece table 14 relative to the frame 16 may be translational and/or rotational along and/or around one or more translation and/or rotation axes. These axes are indicated by 15. Also mounted to the machine frame 16 is a laser tool head 13. It may be exchangeable via a standardized coupling (HSK, cone, . . . ), insertable and withdrawable. Also the tool head 13 may be adjustable along or around one or more translation and/or rotation axes 17 with respect to the machine frame 16.

The laser tool head 13 emits a laser beam 12 that hits the workpiece surface 10 and leads there to liquefaction and evaporation of the material. The laser beam 12 is usually not a continuous laser beam, but rather a pulsating laser light. The impulse power is usually high enough that a single impulse for it alone causes material evaporation. Using a scanner and a suitable optics, the laser beam, and particularly its focal point, is guided through space as desired.

A controller 18 controls the laser beam 12 and, particularly, the position of the focal point of the laser beam 12 in space by means of actuators in head 13. It also controls the axes 15 and 17 and other machine components. Sensor means 19 may, for example, measure the already machined hollow three-dimensionally or may detect the instantaneous position of the laser beam on the workpiece and may supply it in suitable format to the controller 18. A storage 18a holds machining data that may comprise program data for a machining program of a CNC machine.

The workpiece 11 may be a metallic material or may be ceramics or a resin. However, it may also be a paint cover of a carrier. The structure to be machined may be a voluminous hollow or may be some kind of surface treatment hardly reaching into the depth of the hollow.

As an example, in the following the machining of a die cast form for a vehicle dashboard is assumed. It is assumed that the large shape was already machined otherwise, and the machine to be described shall form a suitable surface structure. Since a casting mold is to be machined, a negative shape is to be made. The workpiece is relatively large and may have a surface of at least $0.1 \text{ m}^2$ or at least $1 \text{ m}^2$. In a square shape this corresponds to edge lengths of at least 31 cm or 1 m on the workpiece surface.

Laser heads 13 usually cannot generate such high deflections, or can generate them only with significant losses in quality. For this reason, a frequent approach is that the workpiece surface is separated into segments, each segment is then machined from a respective constant relative position between workpiece 11 and tool head 13. When the machining of the segment is finished, the workpiece is moved relative to the tool head by using axes 15 and 17 and suitably controlling them, so that in a new relative position a new segment may be machined.

Figure 2:
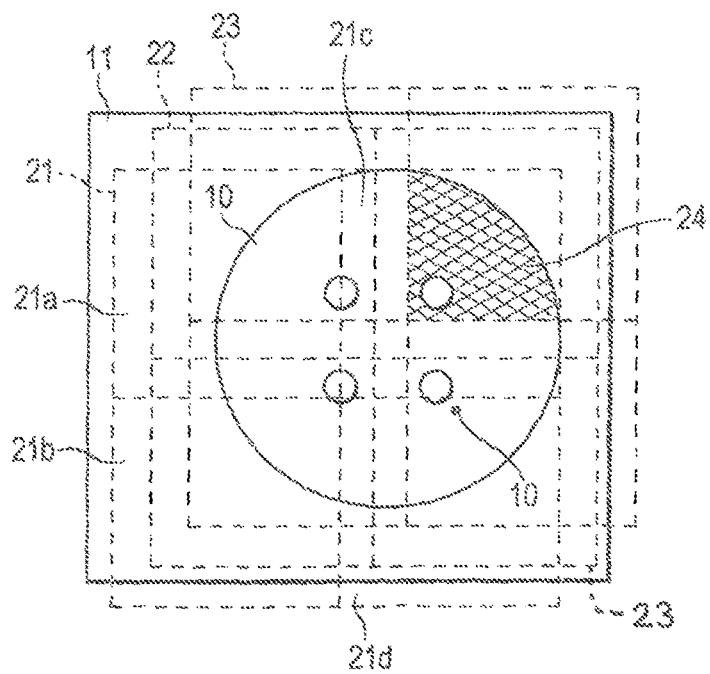

FIG. 2 shows the segmentation of a workpiece in a known manner. The shown workpiece may be the cast mold of a button with four holes, for which in the mold the four columns shown by circles remain. 10 is a hollow in the workpiece surface. It is assumed that the overall size of the workpiece surface is too large for machining it out of a single relative position between tool head 13 and workpiece 11. Thus, the workpiece surface is separated into segments 21a, 21b, 21c, 21d, wherein the separation is a logical separation, not a real separation. For the respective segments a respective particular relative position between workpiece and tool head is adjusted, from which the segment is machined. Both, the segmentation and the setting of the respective relative position, are made under various criteria. One may be the optimization of the angle of incidence. Another may be the avoidance of shadings or collisions.

When the machining of a segment is finished, workpiece and/or tool head are displaced relative to each other such that a good relative position for a further segment is attained, from which the further segment may be machined, and so on. The workpiece surface may be separated into 10 or 20 or 50 or more segments. Further, when a hollow is to be formed into the depth direction, the segment boundaries may, when layerwise material removal is used, be differently positioned in different layers as shown by grids 21, 22, 23 in FIG. 2. The respective grids show segment boundaries in different layers (z position). Preferably, they are displaced against each other such that, at the boundaries, which may show discontinuities, no artefacts at the side walls build up, because these effects are smeared.

Figure 3A:
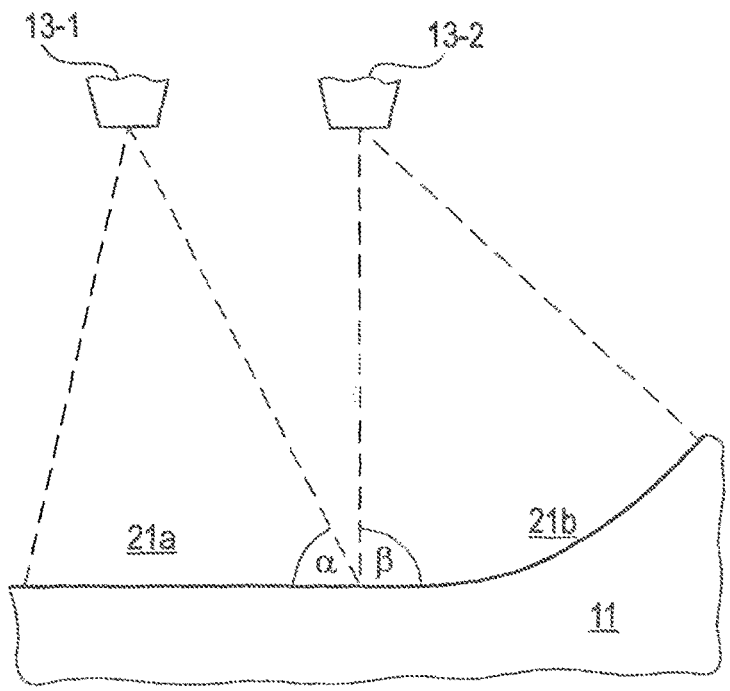

FIG. 3 shows one of the problems that may occur when segmenting workpiece surfaces. FIG. 3a shows that the workpiece surface is separated into two segments 21a, 21b. For each segment, the position of the laser head 13 would be selected such that the respective position relative to the instantaneous workpiece surface is good or optimum. Optimum could mean that, in average, the laser vertically impinges on the workpiece surface such that power is introduced into the workpiece to be machined as uniform as possible. This leads to a very individual positioning of head 13 when the workpiece surface, as shown in FIG. 3a, is uneven. 13-1 and 13-2 show different positions of the head 13.

Figure 3B:
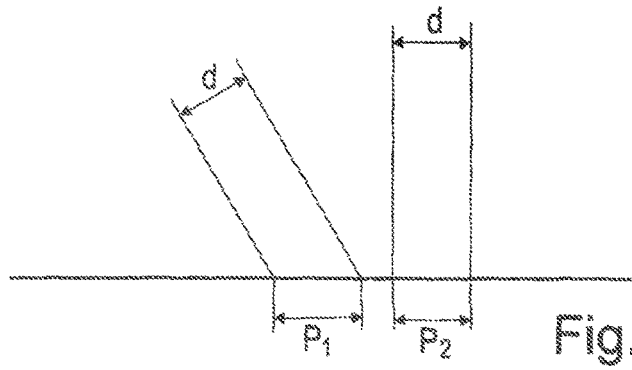
Figure 3C:
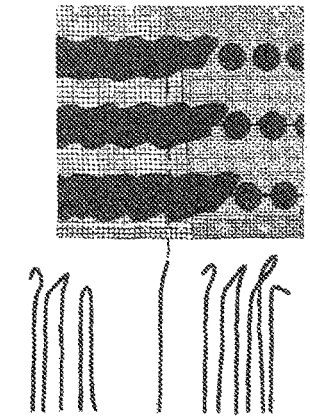

The effect is that in each segment for itself operation may be optimum. However, disadvantages of this approach are shown in FIGS. 3b and 3c. At the boundary between segments 21a and 21b the laser beams from the two positions 13-1 and 13-2 hit the workpiece surface under different angles a and β. When diameter d of the laser beam 12 is respectively the same, the different angles a and β lead, at neighboring impulse spots coming from different relative positions, to different projection measures p1 and p2 on the workpiece surface. This leads to uneven projections of the laser beam diameter on the workpiece surface (geometry error) and, as a consequence, leads to unequal power densities and, thus, different ablation properties (ablation error).

When individual points corresponding to incident spots of single laser impulses are to be formed, they have, at segment boundaries, depending on which side thereof they lie, systematically the same geometry deviations. At vertical incidence, at segment 21b, the shape is substantially circular, whereas at oblique incidence, one obtains an elliptical distortion. Even if it has no functional consequence, the form transition along the segment boundary is often clearly optically recognizable. This is highly unwanted. Also these effects may be "smeared" within one layer by interlacing the track boundaries between segments. However, even then, unevenness may be visible or may have functional consequences.

Figure 4:
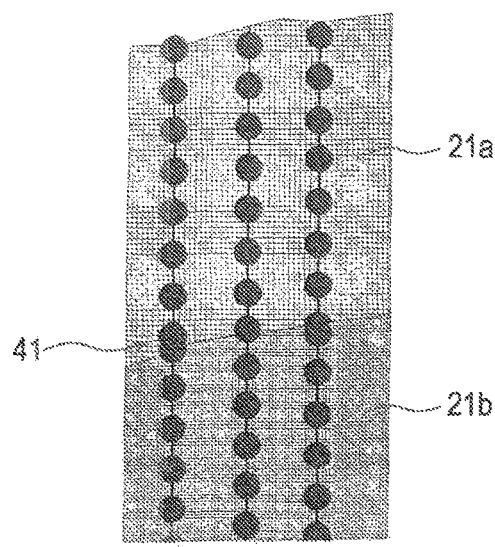

FIG. 4 shows a further problem at segment boundaries.

In each relative position the laser is guided along a plurality of tracks and, in this manner, depending on guidance speed and impulse frequency fp=1/T, generates a sequence of single incidence spots. When, thereafter, for machining a further segment, the relative position is changed, it may come to connection errors, since control within the second, later relative position is correct and uniform in itself, but not in relation to the situation found from machining from the first relative position.

FIG. 4 shows that single points do not regularly follow each other. What is shown is only a connection error in vertical direction of the drawing plane. However, there may also be connection errors horizontal in the drawing plane, which lead to a displacement of the tracks relative to each other. Again, even if these effects have no functional consequence, they often are at least optically recognizable as artefact along the segment boundary, what is again highly unwanted.

Figure 5:
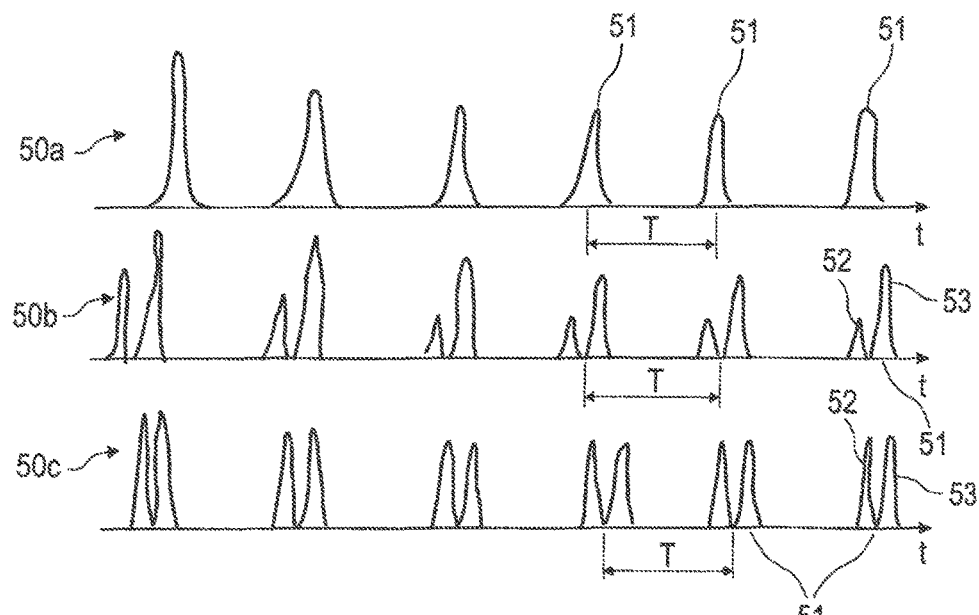

FIG. 5 shows typical laser pulses 50*a*, 50*b* and 50*c* along the time line. 51 symbolizes single pulses or pulse groups which follow each other with a period T in a very regular manner. The duration of period T is for most laser types well and quickly controllable, but is for some laser types controllable only slowly or difficulty. However, in any case, they are relatively uniform and predictable. In pulse 50*a* there are single pulses 51 with period T following each other. In pulse 50*b* there are double pulses from pulses 52, 53 evenly following each other, wherein the respective first one is weaker than is the second one. Also these double pulses define, relative to each other, a period T. In pulse 50*c* also double pulses from pulses 52, 53 are shown, which are equal to each other.

All shown pulses also show a phenomenon upon switch-on. If it is assumed that the respective left pulse/double pulse is the first one after switch-on, one often finds that the first pulses are relatively strong, and the following ones are weaker until they have reached a constant level. Thus, due to this start superelevation, ablation power changes shortly after switch-on. Expressed by diameters of laser pulse hits, the diameter of the first hits would be greater than that of the following ones.

When power density (power per area) on the workpiece surface is uneven, also ablation power is uneven, such that ablation unevenness and ablation mistakes may occur. The uneven power densities may come from the above-mentioned geometry errors or from the described start superelevation.

Summarizing, known segmented workpiece machining methods with laser beams have reasonable preciseness within the respective segment, and artefacts at segment boundaries may be smeared in certain manners, but at the boundaries of neighboring segments, discontinuities in the form of geometry errors, connection errors or ablation errors may occur, which are optically recognizable and/or have functional discontinuities. Both is unwanted.

It is the object of the invention to provide a method for the machining of a workpiece by a laser beam and a suitable laser tool, that improve preciseness of the laser control in segmented workpiece machining, and that particularly avoid optically recognizable differences.

This object is accomplished by the features of the independent patent claims.

In a method for machining a pulsed laser beam, the laser beam is guided across the workpiece surface under a constant relative position between workpiece and tool head. The workpiece is machined sequentially from a first and another second relative position. The machine parameters in the second relative position are controlled such that one or more laser pulse hits from the second relative position on the workpiece surface have a defined position in relation to one or more laser pulse hits made from the first relative position on the workpiece surface, particularly such that they lie one a one-dimensional or two-dimensional grid defined by plural laser pulse hits on the workpiece surface generated from the first relative position.

This method has the effect that the grid given by machining from a relative position is continued in the machining from a later relative position as precisely and symmetrically as possible, so that, in the best case, differences and segment boundaries are not recognizable.

In a further method for machining a workpiece by a laser beam from a tool head, the pulsed laser beam is guided, out of a constant relative position between workpiece and tool, across positions on the workpiece surface. Successively, first workpiece positions of a first workpiece surface segment are machined from a first relative position, and second workpiece positions in a neighboring second workpiece surface segment from a second relative position are machined, wherein the segments are adjacent in an overlapping manner or non-overlapping manner. The first and second segments and the first and second relative position are set in accordance with two criteria, the one of which is setting the angles of incidence in accordance with situations at the respective relative positions, and the other of which is setting the angles of incidence such that, preferably seen in parallel cutting planes, a considered angle of incidence of the laser beam relative to the workpiece surface in the one relative position is chosen with respect to a considered angle of incidence of the laser beam relative to the workpiece surface in the other relative position, preferably such that the difference between the considered angles of incidence is reduced or falls below a predetermined maximum amount.

By this method, the incidence geometries of laser pulse hits on the workpiece surface, that come from different relative positions (in different segments) and that are close or adjacent to each other, are equalized such that the projection geometries of the laser beams on the workpiece surface at the boundary exhibit lower variations and, thus, do not change rapidly. Also in this manner, abrupt functional or recognizable differences at segment boundaries may be reduced.

Workpiece position and relative position may be selected such that the mean angle of incidence of the laser beam relative to the workpiece surface in this relative position is out of a range of 90°±3°.

In a method for machining a workpiece by a laser beam from a tool head, the pulsed laser beam is guided, out of a constant relative position between workpiece and tool head, across positions on the workpiece surface, wherein subsequently first workpiece positions of a first workpiece surface segment from a first relative position, and second workpiece positions in an adjacent second workpiece surface segment from another second relative position are machined, wherein the segments may be adjacent to each other in an overlapping or non-overlapping manner. The segments are smaller than the utilizable working windows of the laser head and are particularly defined by dividing a preliminary segment, wherein the division is made in accordance with considerations of angles of incidence of laser beams relative to the workpiece surface in the preliminary segment and possibly also segments adjacent thereto.

This method is helpful when, within a segment, the laser beam incidence angles vary so strongly that also within a segment the differences may be recognizable. When a preliminary segment may be divided into plural smaller segments, such that within one of these smaller segments the variations are smaller and can be equalized across segment boundaries as described earlier.

As far as angles of incidence are considered, these may be angles of the laser light axis relative to the instantaneous local workpiece surface before the laser beam hits, wherein structural features smaller than 20 or 10 or 5 µm may be equalized.

In a method for machining a workpiece by a laser beam emanating from a tool head, the laser beam is guided across the workpiece surface, and the workpiece is adjusted relative to the tool head by one or more automatically (feedback-) controlled axes. One or more of the axes and the pulsed laser beam from the tool head are operated concurrently and in a mutually related manner.

With such a method it is possible to avoid, by concurrent operation of at least one mechanical axis and the laser beam, artefacts caused by discrete adjustments of different relative positions/segments in at least one area dimension in that large areas of a large workpiece are scanned "non-stop".

In a method for machining a workpiece by a pulsed laser beam emanating from a tool head, the pulsed laser beam is guided across the workpiece surface under a constant relative position between workpiece and tool head, wherein subsequently first and second workpiece positions of a first and a second workpiece surface segment are machined from a first and an adjacent second relative position. The laser beams at the boundary impinge, out of the first relative position, under another angle onto the workpiece surface than they do out of the second relative position. The laser pulse hit positions in one of the relative positions are positioned in accordance with the difference of the mentioned angles of incidence and are, particularly, shifted as compared to other settings.

With this, one obtains the advantage that different projection sizes of the laser beam diameter on the workpiece surface, for example as shown in FIG. 3c, are arranged in a non-overlapping manner.

It is pointed out that in layer-wise material removal the layers need not be plane or even, they may also be bent, uneven. They may follow the original (uneven) workpiece surface or may follow the final outer shape of the hollow to be formed or may be formed uneven according to other criteria. The unevenness may be obtained through suitable selection of the scan boundaries in a segment and/or by corresponding focal control in z-direction.

In a method for machining a workpiece with a pulsating laser beam emanating from a tool head, the pulsed laser beam is guided across the workpiece surface from a constant relative position between workpiece and tool head. Workpiece areas delimited against each other are subsequently machined out of a first and another second relative position. In plural rounds plural layers of material are ablated. The boundaries of workpiece areas are, in one layer, selected differently from those in a layer immediately above or below, particularly qualitatively differently such that, for example, the boundaries in the one layer are not only translatorily shifted against an upper or a lower layer.

For example, the segment boundaries in one layer may follow a rectangular pattern, in a subsequent layer a hexagonal patter, in an again subsequent layer a random patter, etc. Due to the avoided regularity of the segment boundaries, again, the occurrence of artefacts in the finally machined product is reduced.

In a method for machining a workpiece by a pulsating laser beam emanating from a tool head, the laser beam is focused and guided by an optics and a guidance in the tool head. The focal position in depth direction is controlled in accordance with the angle of incidence of the laser beam onto the workpiece surface.

By a willfully controlled defocusing at the workpiece surface the ablation performance per pulse of the laser can be controlled. This parameter can be used for compensating other quantities influencing the ablation performance, such as the angle of incidence. The dependence may be such that, at substantially right-angled incidence and, thus, high power density, a certain defocusing (focus position above or below the instantaneous workpiece surface) is chosen, whereas, at an oblique incidence, the focus is positioned within the workpiece surface. Variations of ablation performance due to geometric relations are equalized by variations of the focal position.

A laser tool for machining a workpiece by a pulsed laser beam emanating from the tool has a laser source, an optics for forming the laser light, and a guidance for guiding the laser light. The optics comprises, in the beam path, an adjustable optical element that comprises different optical properties when considering them in planes twisted against each other, but guiding the laser beam.

The optical element with the different optical properties in different layers can be used for compensating differences caused by the working geometry. They may have effects similar to lenses for correcting astigmatism or may themselves be lenses with astigmatism. The amount of astigmatism and/or the orientation may be adjustable. Likewise, oval apertures may be provided, the orientation of which is adjustable, for example for equalizing different ovalities at segment boundaries.

Generally speaking, machining at a constant relative position may be such that the beam hit location of the laser light is guided across the instantaneously machined surface segment by deflecting the laser beam, particularly its focal region, in two dimensions x and y (or at constant focal length across a sphere section) via galvano-mirrors, controlling the focal position depending on deflection (by a z-shifter) and switching a light valve.

Some of the above described methods and method steps may be planned in advance and implemented in a corresponding pre-established machining program stored in the machine and used during workpiece machining. Some of the steps can or must, however, be controlled in real time or controlled in dependence on sensor signals.

The described methods may be used for the voluminous formation of hollows with fully covering layer-wise material removal or for the surface-treatment for optical or other purposes or for surface texturing by ablation of punctual or contiguous structures in only one or some few layers. The workpieces may, for example, be large die molds for thermoplasts mass products, for example in car manufacturing.

The focal position of the laser beam in space is reasonably forseeably controllable. In a simplified explanation (neglecting the sphere-shaped geometry caused by the vibrating mirror) one can say that the deflection of the focus in the area is made by vibrating mirrors with crossing vibration axis (control substantially in x-y-plane, see coordinate definition in FIG. 1), whereas in depth direction (z-direction, away from the tool) the focus is controlled by means of quick optical elements ("z-shifter"). These components may be under continuous and quick control from the machine controller.

Figure 6:
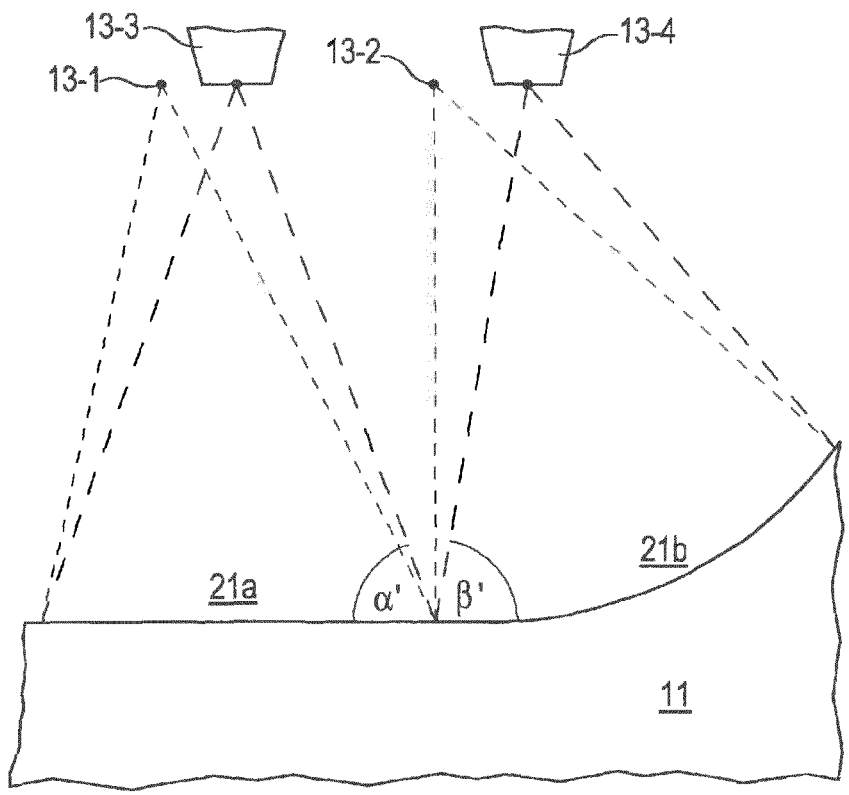
Figure 7:
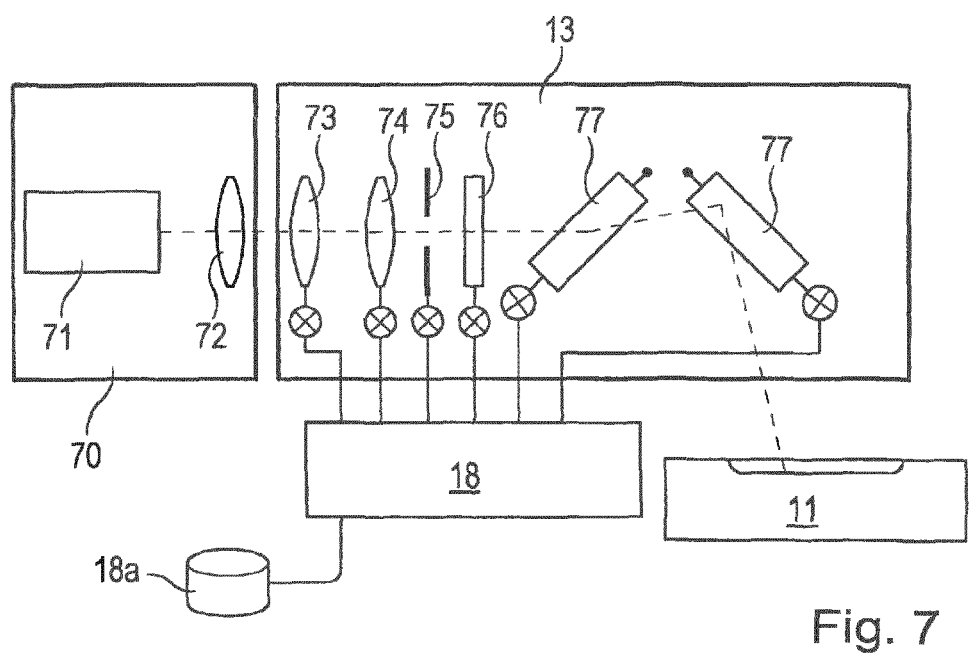
Figure 8:
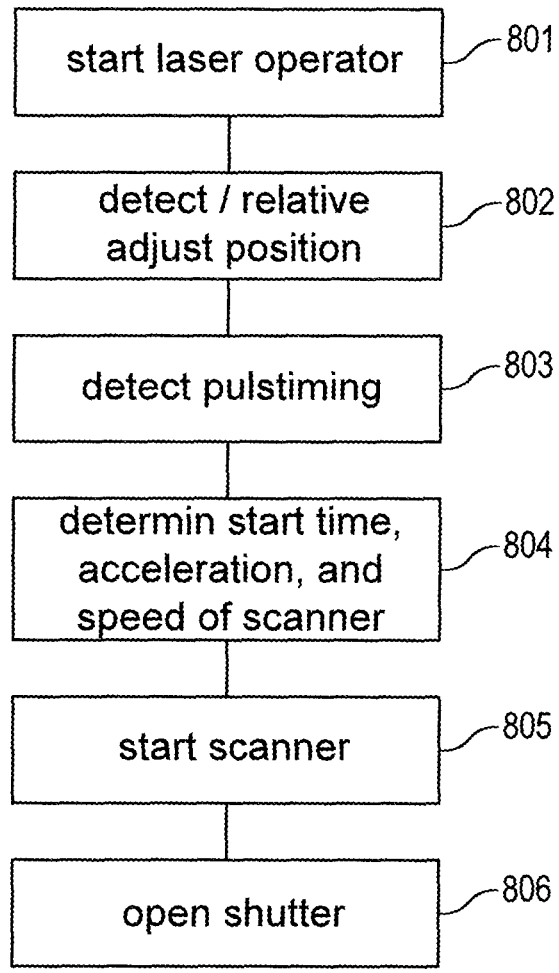
Figure 9:
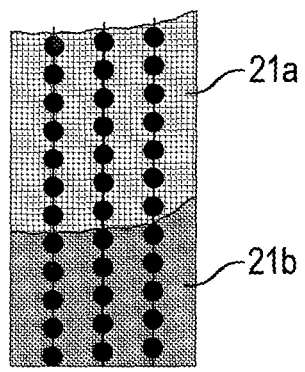
Figure 10A:
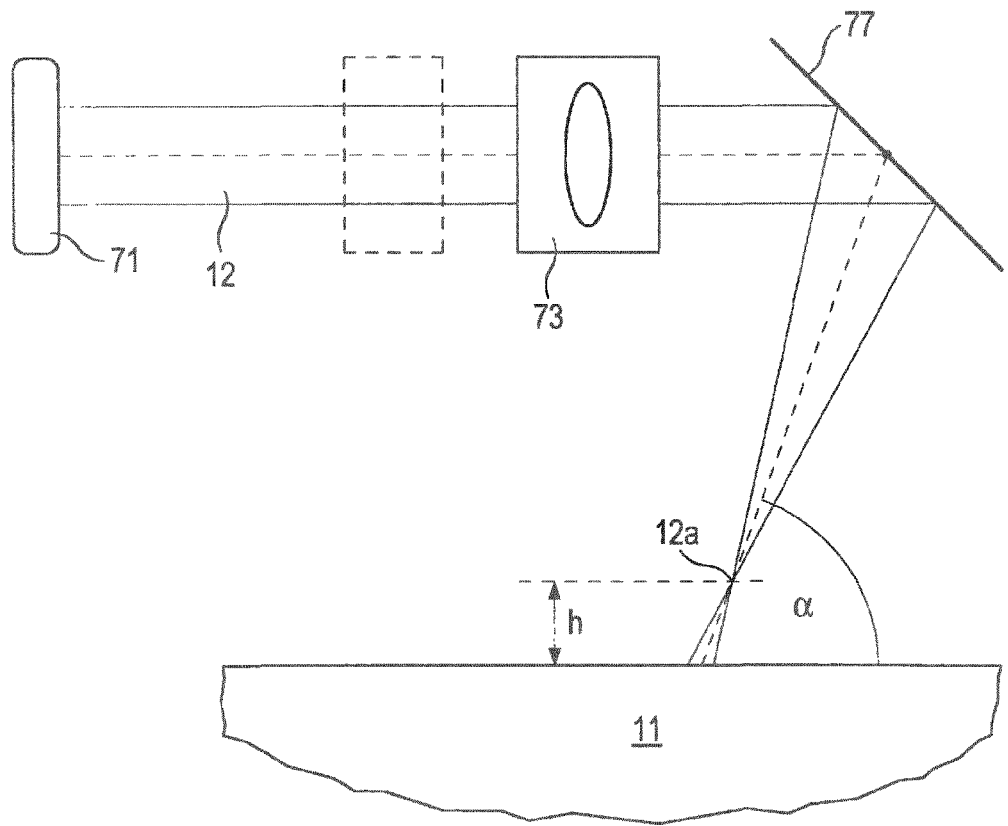
Figure 10B:
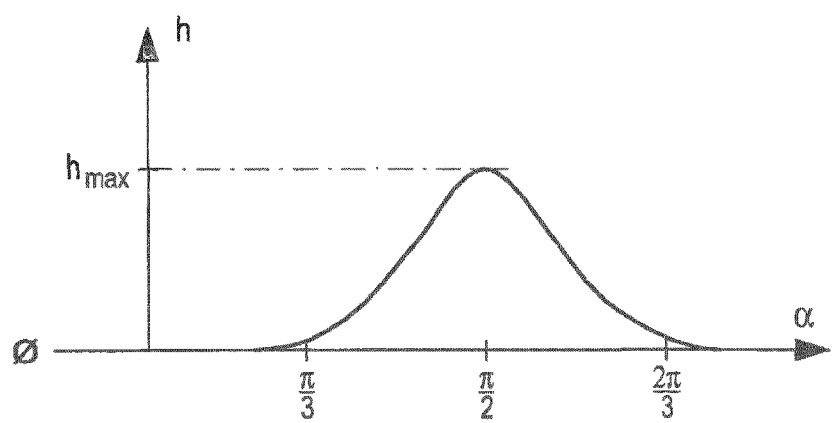

In the following, referring to the Figures, embodiments of the invention are described in which FIG. 1 is a general schematic view of a machine in which the described methods and tools may be used, FIG. 2 shows segmenting the workpiece surface, also in plural layers, FIG. 3 shows sketches for explaining problems at the impinging laser beam, FIG. 4 shows sketches for explaining problems at the boundary of segments, FIG. 5 shows typical laser pulses, FIG. 6 shows a sketch for explaining the setting of angles of incidence of the laser beam, FIG. 7 schematically shows a laser tool, FIG. 8 shows a method for improving the connection at segment boundaries, FIG. 9 shows the result of the method shown in FIG. 8, FIGS. 10a and 10b shows schematic sketches for angle-dependent focus control.

Generally, in this specification, features shall be deemed combinable with each other even if such a combination is not expressively mentioned, as far as the combination is technically possible. Explanations of method steps and methods shall also be understood as device components and devices or apparatus components and apparatuses that implement the respective method step or methods, and vice versa.

Generally, in this specification, a coordinate system is used as shown in FIG. 1. The z-direction is vertical and may be the depth direction of the hollow, whereas the x- and y-coordinates lie horizontally. This is to be understood for the purpose of explanation. Due to the various rotational axes and complex geometries in practical use, it can generally not be assumed that, for example, the (instantaneous or original) workpiece surface lies in the x-y-plane or that the depth direction of the hollow is always vertically oriented.

FIG. 6 shows a method, in which the effects explained with reference to FIG. 3c are reduced or avoided. Here, the relative positions between tool 13 and workpiece segments 21a and 21b are not only selected under respective individual optimization, but also under mutual consideration, particularly such that the angles of incidence a' and β' in the boundary area of the segments 21a, 21b are equalized such that also the projections of the laser cross-section onto the workpiece surface in the boundary region of the segments 21a, 21b are less different and, in the best case, equal.

For setting the respective relative positions in the various segments between tool head 13 and segments 21a, 21b . . . . for machining the respective surface segment, respectively at least two criteria are applied. The one is the individual setting for the respective segment that may be made according to necessary criteria or optimization criteria for the respective segment, whereas the other may be equalization of the settings such that the angles of incidence a ' and β' in the boundary region are equal or at least less different. Particularly, results obtained from using the one criterion may be modified by using the other criterion.

First, the relative position may be set only considering the segment for it alone, for example, as shown in FIG. 3, such that within the respective segment 21a, 21b the relations are best possible, for example in that the average angle of incidence is substantially rectangular.

For this, positions 13-1 and 13-2 of a laser head 13 are set for machining the segments 21a and 21b, respectively. Also other criteria may be used here, such as avoiding shades or mechanical collisions.

Then, from these different relative positions, different angles of incidence a, β of the laser beam may occur in the boundary regions between the segments 21a, 21b. This is particularly the case when the workpiece is uneven. The particular setting may then, as shown in FIG. 6, be modified such that both positions 13-1 and 13-2 are shifted in the right direction towards 13-3 and 13-4, respectively. Through this, the settings within the individual segment are no longer fully optimum, but the angles of incidence a' and β' (preferably seen in a single or in parallel sectional planes are equalized to each other such that also the hit geometries of the laser diameter are equalized with respect to each other such that the mentioned artefacts are reduced or avoided.

Vice versa, one may also proceed such that, first, same angles of incidence a' and β' are established in the boundary region, and these settings are then modified in accordance with criteria relating to the respective segment itself and optimization for machining the respective segment.

Then, a further evaluation for balancing the effects of the various two criteria against each other may be made such that it is evaluated how much is obtained and how much is lost if, in accordance with the one or the other criterion, settings or modifications of settings are made for obtaining an overall satisfying result.

These steps may be made in advance in work planning. The results may be reflected in a machining program that sets the respective parameters when running during workpiece machining.

A result of equalizing the angles of incidence in the boundary regions of adjacent segments may be that, in at least one segment, the average angle of incidence is not, as often usually desired, optimally right-angled, but is below optimum shifted against the vertical, for example by at least 3° or at least 6°.

As far as angles of incidence are considered, these may be, if not defined differently, angles of incidence of the laser beam on the workpiece surface in the respective boundary region or may be average angles of incidence across the entire segment. Angles a and 180°-a are considered to be the same.

FIG. 8 shows a method for reducing or avoiding connection mistakes at segment boundaries, as shown in FIG. 4, for obtaining results as shown in FIG. 9. It shows the approach in an individual segment along traces which run vertically in the drawing plane. Here, first, all traces in a segment 21a are scanned with the laser scanner by controlling laser and scanner jointly. Thereafter, the relative position is changed by using the mechanical axes 15 and 17 such that the adjacent segment may be machined by scanning the traces there.

Control is made such that, in the later (second) relative position, the machine parameters (relative position, laser control, . . . ) are set such that the laser pulse hit locations in the second segment have a defined position with reference to the laser impulse hit locations in the first segment, particularly such that they have a defined relation to a grid or lie in a grid defined by the hit locations during machining of the first segment. The predetermined grid and the connection thereto may be considered to be one-dimensional or two-dimensional.

Here, one may proceed as shown in FIG. 8 after workpiece machining from a first relative position is terminated. In step 801 laser operation is started so that laser pulses are generated. However, they may still be shaded by a shutter (light valve). Before or thereafter, in step 802 the relative positioning of the laser head and the workpiece for machining the new segment adjacent to the earlier machine segment is made and may be sensor controlled. In step 803 the laser pulse timing is detected precisely within the period T of the laser pulses.

In step 804 the mechanical parameters are set for obtaining a defined start and incidence of the laser pulses in the new segment. These settings may comprise start time of the scanner operation, acceleration of the scanner, final speed (angular speed) of the laser. Likewise, the opening time of the shutter may be determined here. In step 805, the scanner is started in accordance with the set quantities. When the desired target value is reached, the shutter is opened in step 806 such that laser pulses hit the workpiece surface.

Particularly when the laser pulse frequency is poorly controllable, the respective given pulse timing may be used phase-precisely as an input quantity for determining the values in step 804 after switch-on of the laser. When, however, frequency and/or phase of the laser pulses are controllable, these may be set as the result of the determinations in step 804 and may later be adjusted correspondingly.

The settings are made such that the desired results are obtained, namely that the hit positions of the laser pulses in the new relative position, i.e. in the adjacent new segment, continue the grid given by the machining of the former segment in one grid dimension or in both grid dimensions as precisely as possible.

For obtaining, in step 804, the desired settings, data relating to the former machining may be acquired either through sensors and then be used, for example by optically measuring the hit points of the earlier machining, or, as far as available, values already stored during operation and machining of the laser control in the antecedent segments may be used. In this manner, information on the already existing grid may be generated. If, however, the machining is mechanically defined such that the theoretical machining position (hit position of the laser pulses on the workpiece surface) corresponds to the real ones with sufficient precision, the determinations in step 804 may also be made with reference to the theoretical values in the antecedent segment.

In this manner, in machining the new segment 21b from the new relative position the laser pulses hit, in one or both area dimensions, the grid on the workpiece surface as precisely as possible such that the errors shown in FIG. 4 are avoided and that the result shown in FIG. 9 is obtained.

It is also possible to use in the new relative position one or more test runs with weak or attenuated laser light without machining effect, the results of which (hit position of the laser pulses) are detected by sensors and, in accordance with the detected results, set parameters are varied or set in use these parameters for workpiece machining.

It is generally pointed out that sensors 19 may be provided such that the instantaneously given hollow (intermediate result of machining) during machining or hit positions during the above-described test runs are measured in real time with high precision in two dimensions or in three dimensions and that these measurement values are stored in the storage means 18a in real time (during workpiece machining) such that they can be read out. Measuring may be made with high definition in the x, y and z coordinates such that a "map" of the hollow machined so far is stored with such precision that the real grid is known or can be determined from it.

The sensors 19 may be formed such that they detect the hit positions of the laser pulses on the workpiece surface precisely in two or three dimensions. The sensors 19 may be optical sensors evaluating the processing light or, similarly to a camera, taking images that are evaluated.

Setting the relative positioning in step 802 may be made according to predefined/programmed parameters, whereas the determinations in step 804 and the antecedent detection may be made in real time during workpiece machining.

For avoiding segment boundaries as far as possible, laser head 13 and the mechanical axes 15, 17 may be operated simultaneously and adjusted with respect to each other. In a simple case, for example, a translation axis 15 of the workpiece table 14 may, for example, slowly and continuously, be driven along one direction, and simultaneously the laser tool 13 is operating by suitably driving the scanner and the laser. In this manner, also a large workpiece may be scanned continuously without segment boundaries in one dimension such that the number of segment boundaries decreases.

The segments may then be straight or bent "machining strips" running along the entire workpiece surface or at least a part thereof. There are no machining boundaries along the strip direction. Boundaries then need only be considered towards adjacent strips and are taken into account as described above. Considerations and machining can be as described with reference to FIGS. 6 and 8. When first and second workpiece positions of a first and a second workpiece surface segment are machined consecutively from a first and a second relative position, and in the boundary region the laser beam hits the workpiece from the one relative position under another angle as it does from the second relative position, the laser pulse hit positions in one of the relative positions can be positioned (also) in accordance with the difference of the mentioned angles and may particularly be shifted as compared to other settings (e.g., offset).

Particularly, oval hits can be offset away from less oval hits and/or less oval hits are moved towards more oval ones. A quantitative measure for this may be the overlapping degree or the distance of adjacent laser pulse hits. In this manner, the overlappings or distances in the boundary region are equalized (made smaller) or are made equal. The hit positions may be positioned such or shifted compared to other determinations such that, at the segment boundary and, preferably, also within the boundary region of the second segment, the overlappings of the pulse hits are as in the boundary region of the first segment or are equalized thereto, if other criteria made already settings.

Ovality ov may be expressed as the ratio ov=dmax/dmin of the maximal diameter in relation to the perpendicular minimal diameter of the projection of the laser beam onto the workpiece surface (approximately an ellipse). Likewise, under the assumption of a circular laser beam cross-section, it may also be computed from the angle of incidence of the laser beam relative to the local workpiece surface using the expression ov=1/sin(a). Generally, a possibly perpendicular angle of incidence (90°) and around it "relatively small deviations" of ±30° are preferred, corresponding to ovalities of 1 and 1.15. However, in minutely structured or in strongly undulating hollows or structures in workpieces, there may locally—together with the angular deflection of the laser beam by the scanner—occur also very oblique angles of incidence (a<45°, a<30°) up to glancing intersections so that ovalities ov >1.4 or ov >2 may occur.

The offset direction may be the direction of the large axis of the larger oval or may be the direction of the grid that is closer to the long axis of the oval.

Through this one obtains the effect that different projection sizes of the laser beam diameter on the surface, as shown, e.g., in FIG. 3c, are arranged in a non-overlapping way. In the case of FIG. 3c the oval hits in the left segment 21a may, for example, be shifted leftwards so that they do not overlap in the boundary region.

FIGS. 4 and 9 show segment boundaries perpendicular to or intersecting the machining traces. The same considerations, however, also apply to segment boundaries parallel to machining traces. Trace distance, trace direction and hit positions in the boundary traces will then suitably be set such that machining from the new relative position matches the grid defined by the earlier machining as precisely as possible.

Segment boundaries may be straight-lined, but not necessarily. In any case, they are theoretical boundaries. When the laser pulse hits define grids of distinguishable hits, the segment boundaries may, during work planning and programming and/or in real time at workpiece machining, be chosen or modified such that individual hits can unambiguously be allocated to the one or the other segment.

It is generally pointed out that the methods described in this specification need not only be used individually, but may also be used jointly and combined with each other.

Material may be ablated in plural layers. One layer is formed by traces of laser pulse hits. Within the trace, the laser pulse hits may be continuous/overlapping, but this is not necessary, and adjacent traces may be continuous/overlapping, but also not necessarily, such that a layer may be ablated punctually or in a strip-shaped or in an area-covering manner. When, in one relative position between laser head and workpiece within one layer the ablation was made as desired completely or trace-wise or punctually, one may proceed either to a new relative position or one may, from the same relative position, ablate material in a further—lower-lying—layer. The layers may be plane, but this is not necessary, as already said above. Using the z-shifter the focal position may be controlled also in z in dependence on the instantaneous deflection of the laser (defined either angularly or by x-y) such that uneven layers may be made.

When plural layers are ablated, and in each layer a segmented approach is taken, the segment boundaries in the individual layers may be chosen to be qualitatively different from each other. For example, they may be rectangular in the one layer and hexagonal in the subsequent layer, in a further following layer random, for example as a Voronoi pattern, in a following layer triangular, etc. The segment boundaries may, in all layers, be random, for example Voronoi line patterns between pseudorandom point selections.

This differs from the known approach of FIG. 2 in that in FIG. 2 the segment boundaries in the different layers are shifted against each other only by translation for avoiding build-up of artefacts at the walls of the hollow. The qualitatively different segment boundaries in adjacent layers as described have the effect that also during ablation artefacts do not build up which would lead to unequal ablation properties.

If unequal angles of incidence cannot be avoided at segment boundaries, one or more compensation strategies or compensation steps may be taken, particularly for smaller angles of incidence:
   introducing an offset at the start of the trace, preferably in dependence of the angle, such that overlappings from the different ovalities are avoided by pulling apart,
   increasing laser power for keeping constant, in larger oval hit areas, the power introduced per area,
   increasing the scanning speed in trace direction for pulling apart the hit locations for keeping the power input per area substantially constant,
   beam shaping such that different hit geometries in boundary regions are compensated by beam shaping, particularly shaping the beam cross-section, for example by astigmatic lenses, oval apertures or the like.

A further possibility of controlling the power introduced per area is a controlled defocusing of the laser compared to the workpiece surface as shown, for example, in FIGS. 10a and 10b. FIG. 10a shows the laser source 71 emitting the (pulsed) laser beam 12. Amongst others, it passes the adjustable focusing 73 (z-shifter) capable of quickly adjusting the focal length of the optics and, thus, the focal position. FIG. 10a shows the focal position at 12a displaced by the height above the workpiece surface. 77 symbolizes the scanner that uses vibrating mirrors (galvo-mirrors).

Corresponding to the different angular positions of the mirrors 77, beam 12 hits the workpiece surface under different angles a, so that the different projections of the beam diameter on the workpiece surface occur as already explained with reference to FIGS. 3b and 3c. Correspondingly, power per area changes. This may be compensated by controlling the focal position to be above or below the workpiece surface in dependence on the angle.

Particularly, control may be such that at approximately vertical incidence (a=90°=π/2) a largest height hmax of the focus 12a above or below the workpiece surface is adjusted. This compensates the here not given geometrical distortion by an optical spread. At smaller angles a of incidence, the geometrical distortion becomes larger. Correspondingly, the optical spreading can be chosen to be smaller by making smaller the height h above or below the workpiece surface until, at a chosen angular position, for example 90° to −30°, it becomes zero and remains like this. In this way, geometrical distortions can approximately be compensated by optical beam spreading or beam constriction.

FIG. 10b shows a corresponding characteristics. The height h of the focus 12a above or below the surface of the workpiece 11 is maximum at vertical incidence and drops left and right thereof. Both, the height hmax as well as the other parameters of the characteristics are chosen such that a best possible overall distribution across the entire range of angle a is given. The height difference h may already be implemented in the predetermined machining program or may be set in real time in dependence on the angle or other control parameters in a superimposed manner.

FIG. 7 shows a laser tool head. It may be the tool head 13 of FIG. 1. However, some components may be separate from the actual tool head 13 used in the machine, for example, the laser light source 71 and corresponding optics 72. Together they may form a light source 70 provided separately from the machining head 13 and generating pulsed laser light that is guided or radiated to the machining head 13 and, then, available there as source light.

The machining head 13 comprises components for beam shaping and components for beam guidance. Generally speaking, the machine head 13 is connected to the controller 18. Particularly, actuators in the machine head 13 may be adjustable in accordance with commands from the controller 18. 77 denotes two vibrating mirrors with intersecting vibration axes for guiding the laser beam across the area. They are addressed as "scanner" or as "galvo-mirrors". 73 designates an adjustable focusing of the laser, the so-called z-shifter. It determines the focal width of the optics and, thus, the position of the focus 12a of the laser beam in radiation direction that can, in a simplified manner, be seen as z-direction. The z-shifter is a quick optical component that can change quickly and in real time under control from the controller and can, for example, depending on x and y, adjust the focal position.

74 also is a quickly adjustable optical lens with astigmatic effect, i.e. having, in different planes in space, which nevertheless guide the laser beam, different focal lengths. The astigmatism may, in quantity and position, be quickly and in real time automatically adjustable, for example by using pressure-sensitive or deformable optical materials that may receive pressure from corresponding piezo elements or other actuators, controlled by the controller, or the like. The different focusing is then controllable in amount and orientation and may be used by the controller 18 of the machine for compensating other quantities, particularly the already mentioned projection geometries on the surface, as shown in FIG. 3b.

75 symbolizes an aperture with an opening smaller than the laser cross-section, which is not circular and will correspondingly lead to partial shading of the laser beam. It may also be adjustable in its anisotropy and subject to control activities from the controller 18. The aperture 73 may be a mode aperture, i.e., an aperture that shades marginal radiation.

76 is an adjustable attenuation allowing a quick reduction of laser power. It is connected to the controller 18.

A z-shifter 73 is provided in virtually all scanners and laser heads for quickly controlling the position of the focal point. One or more of the mentioned optical elements, astigmatic lens 74, aperture or mode aperture 75 and attenuation 76 may be provided in addition. All elements are connected to the controller 18 and may be used for equalizing unevenness caused particularly by unequal geometric projections of the laser cross-section on the instantaneous workpiece surface.

This compensation may be made in real time (during workpiece machining) and may be set variable. Also here, earlier stored values or values from sensors 19 may be used as input quantities for the required determinations. Adjustability may be quick enough that it is made for the respective instantaneous position of the laser beam for making compensations also within a trace. When, for example, the laser beam is guided along a trace from the one end of a segment to the other end of the segment, and the angle of incidence changes from 70° to 90° to 110°, thus the projection of the laser beam cross-section changes from oval to circular and, then, again oval; correspondingly the astigmatism of a lens may be guided such that the changing ovality is balanced by a compensating setting of the ovality of the laser cross-section by the adjustable astigmatism. Similar considerations apply for the mentioned aperture or mode aperture and for the mentioned attenuation.

Many of the above-mentioned features are represented in the design of the controller of a CNC machine or a programmable machine tool. Insofar, also a machine controller adapted for controlling or executing a method as described above in a machine tool is an aspect of the invention. Various of the mentioned features are implemented by software running in a controller of a CNC machine or a programmable machine tool. Insofar, also a data carrier with computer-readable code thereon that implements, in a CNC machine at execution time, a method or a machine or a machine controller as described above is an aspect of the invention.

Typical particular values are:
Laser type: fiber laser or ultrashort pulse laser Wavelength: 100 to 2,000 nm, particularly 300 to 1,100 nm Laser pulse frequency >20 kHz, >50 kHz, >500 kHz, >1 MHz, >2 MHz, >5 MHz Adjustability of pulse frequency and/or amplitude: "slow" trace-wise or "quick" pulse-wise Segment size >10 mm, >20 mm, >50 mm, >100 mm Number of segments on the workpiece >10, >50, >100

Laser diameter at focus corresponding to diameter of pulse hits at vertical focused incidence: 10 μm-100 μm Ovality ov=dmax/dmin >1.1, >1.4, >2

Layer thickness d corresponding to ablation depth of a pulse: lower limit 1 μm or 2 μm, upper limit 5 μm or 10 μm Laser pulse power: lower limit 0.1 mJ or 0.2 mJ or 0.5 mJ, upper limit: 2 mJ or 5 mJ or 10 mJ Deflection of laser beam: up to ±30°

Angle of incidence of the laser beam with respect to local workpiece surface: 90°±30° to 90°±70°

Path speed of laser beam >500 mm/s, >1000 mm/s, >2000 mm/s, >5000 mm/s

Workpiece size >0.1 $m^2$ or >1 $m^2$ or >30 cm or >1 m.

The invention claimed is:

1. A tool for machining a workpiece by a pulsed laser beam emanating from the tool, comprising a laser source, an optics for shaping the laser light and a beam guidance for guiding the laser light,
    including that
    the optics comprises an adjustable optical element in a radiation path, that comprises different optical properties seen in planes twisted against each other, but carrying the laser beam.

2. The tool according to claim 1, including that the adjustability of the optical element comprises adjusting at least one of the orientation, the difference of the properties in said twisted planes, and the insertion or withdrawal of the optical element into or from the beam path.

3. The tool according to claim 2, including that the element is a lens that has different focal lengths in the mentioned twisted planes, or is an aperture that has different aperture sizes in the mentioned twisted planes.

4. The tool according to claim 1, including that the element is a lens that has different focal lengths in the mentioned twisted planes, or is an aperture that has different aperture sizes in the mentioned twisted planes.

5. A method for machining a workpiece using the tool according to claim 1 by a pulsating laser beam emanating from a tool head, the laser beam being focused and guided by optics and a beam guidance in the tool head,
    including that
    the focal position is controlled in depth direction in accordance with the angle of incidence of the laser beam on the workpiece surface.

6. The method according to claim 5, in which the distance between the laser focus and the workpiece surface increases as the angle of incidence approaches 90°.

7. The method according to claim 5, including that surface structurings are made by single or some few contiguous laser pulse hit points.

* * * * *